United States Patent
Li et al.

(10) Patent No.: US 12,355,499 B2
(45) Date of Patent: Jul. 8, 2025

(54) UE SELECTION FOR UE AIDED ANTENNA CALIBRATION

(71) Applicant: Telefonaktiebolaget LM Ericsson (publ), Stockholm (SE)

(72) Inventors: Shaohua Li, Kanata (CA); Jianguo Long, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 18/022,768

(22) PCT Filed: Aug. 24, 2020

(86) PCT No.: PCT/IB2020/057912
§ 371 (c)(1),
(2) Date: Feb. 23, 2023

(87) PCT Pub. No.: WO2022/043730
PCT Pub. Date: Mar. 3, 2022

(65) Prior Publication Data
US 2023/0327783 A1    Oct. 12, 2023

(51) Int. Cl.
*H04B 17/12* (2015.01)
(52) U.S. Cl.
CPC .................... *H04B 17/12* (2015.01)
(58) Field of Classification Search
CPC ................. H04B 17/12; H04B 7/02
(Continued)

(56) References Cited

U.S. PATENT DOCUMENTS

| | | | |
|---|---|---|---|
| 2013/0034010 A1* | 2/2013 | Gao | H04L 25/0204 370/252 |
| 2013/0114459 A1* | 5/2013 | Luo | H04B 17/12 370/252 |

(Continued)

FOREIGN PATENT DOCUMENTS

| | | |
|---|---|---|
| EP | 2566283 A1 | 3/2013 |
| EP | 3119011 A1 | 1/2017 |
| WO | 2014032271 A1 | 3/2014 |

OTHER PUBLICATIONS

Author Unknown, "Technical Specification Group Radio Access Network; Evolved Universal Terrestrial Radio Access (E-UTRA); Physical channels and modulation (Release 16)," Technical Specification 36.211, Version 16.2.0, Jun. 2020, 3GPP Organizational Partners, 248 pages.

(Continued)

*Primary Examiner* — Don N Vo
(74) *Attorney, Agent, or Firm* — Sonoda & Kobayashi Intellectual Property Law; Sarvajit S. Patil

(57) ABSTRACT

Embodiments of the present disclosure provide methods, apparatuses, and computer products for base station antenna calibration. A method is implemented in a base station for a cellular communications system. The method includes selecting, from a plurality of User Equipments, UEs, assistant UEs to assist the base station with antenna calibration, wherein selecting the assistant UEs is based upon criteria that includes UE channel state information, CSI, from the UEs; one or more uplink channel characteristics of an uplink channel from the UEs to the base station; a UE capability of the UEs, UE traffic information related to the UEs; and any combination thereof. A further step is obtaining antenna calibration assistance information from the assistant UEs, the antenna calibration assistance information being infor- (Continued)

mation that is used by the base station for antenna calibration.

21 Claims, 8 Drawing Sheets

(58) Field of Classification Search
USPC .................................................. 455/67.11
See application file for complete search history.

(56) References Cited

U.S. PATENT DOCUMENTS

| | | | | |
|---|---|---|---|---|
| 2016/0308624 | A1* | 10/2016 | Rong | H04B 17/14 |
| 2019/0149250 | A1 | 5/2019 | Jidhage et al. | |
| 2019/0349048 | A1* | 11/2019 | Huang | H04B 7/0613 |
| 2020/0177287 | A1* | 6/2020 | Yu | H04B 7/0617 |
| 2023/0018017 | A1* | 1/2023 | Zhu | H04B 17/102 |

OTHER PUBLICATIONS

Author Unknown, "Technical Specification Group Radio Access Network; Evolved Universal Terrestrial Radio Access (E-UTRA); Physical layer procedures (Release 16)," Technical Specification 36.213, Version 16.2.0, Jun. 2020, 3GPP Organizational Partners, 576 pages.
Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.1.1, Jul. 2020, 3GPP Organizational Partners, 1,078 pages.
Author Unknown, "Technical Specification Group Radio Access Network; NR; Physical channels and modulation (Release 16)," Technical Specification 38.211, Version 16.2.0, Jun. 2020, 3GPP Organizational Partners, 131 pages.
Author Unknown, "Technical Specification Group Radio Access Network; NR; Physical layer procedures for data (Release 15)," Technical Specification 38.214, Version 15.4.0, Dec. 2018, 3GPP Organizational Partners, 102 pages.
Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.
Qualcomm Europe, "R1-080659: Calibration Procedures for TDD Beamforming," 3GPP TSG RAN1 #52, Feb. 11-15, 2008, Sorrento, Italy, 6 pages.
International Search Report and Written Opinion for International Patent Application No. PCT/IB2020/057912, mailed May 31, 2021, 15 pages.

* cited by examiner

UE SELECTION FOR UE AIDED ANTENNA CALIBRATION

This application is a 35 U.S.C. § 371 national phase filing of International Application No. PCT/IB2020/057912, filed Aug. 24, 2020, the disclosure of which is incorporated herein by reference in its entirety.

TECHNICAL FIELD

The non-limiting example embodiments of the present disclosure generally relate to a technical field of wireless communication and specifically to methods, apparatuses, and computer program products for antenna calibration.

BACKGROUND

FIG. 1 is a diagram depicting a first antenna 100, a second antenna 101, a third antenna 102, and a fourth antenna 103 that comprise correlated downlink transmit antennas 104. As depicted in FIG. 1, the antennas 104 are one of the most commonly used 4-antenna setups for Long Term Evolution (LTE) enhanced Node B (eNB) and will likely also be used in New Radio (NR) low band systems. The antennas 104 are cross-polarized, i.e., the antennas 104 are either placed with a slant angle of 45° (polarization A) or −45° (polarization B). The first antenna 100 and the third antenna 102 are a first cross-polarized antenna pair, and the second antenna 101 and the fourth antenna 103 are a second cross-polarized antenna pair. The two cross-polarized antenna pairs are closely spaced with 0.5λ to 1λ separation. The advantage of such a configuration is that it provides excellent beamforming gain because the antennas 104 comprise correlated and co-polarized antenna pairs. The first antenna 100 and the second antenna 101 are a first co-polarized antenna pair, and the third antenna 102 and the fourth antenna 103 are a second co-polarized antenna pair. Moreover, this particular 4-antenna setup allows reasonable multiplexing gain of up to four layers thanks to a combination of polarization diversity and sufficient spatial diversity.

Beamforming with correlated antennas requires that the phase difference between individual antenna elements is small. Any antenna error that affects phase relations could prevent systems from realizing full beamforming potential. Ideally, to achieve beamforming gain, the antennas 104 shown in FIG. 1 should be calibrated. However, because of cost, most of the 4 transmit antennas setups currently used in LTE eNBs are uncalibrated. When the antennas 104 are uncalibrated, the signal over each antenna has a different phase $\varphi_k$, k=0,1,2,3. When the wireless industry evolves into Fifth Generation (5G), those radio-antenna systems will be reused.

For each pair of correlated co-polarized antenna pairs of FIG. 1, i.e., the first co-polarized antenna pair for polarization A or the second co-polarized antenna pair for polarization B, the main lobe of the radiation pattern or beam during transmission points in the direction where the phases of antenna signals are added constructively. Hence, beam direction depends on the phase difference between two co-polarized antennas such as the first antenna 100 and the second antenna 101 or the third antenna 102 and the fourth antenna 103. When the phase difference between two correlated antennas changes, the beam direction changes, as illustrated by FIG. 2.

The phase difference between antennas in each co-polarized antenna pair can be expressed approximately as:

$$\theta_A = \varphi_1 - \varphi_0$$

and $$\theta_B = \varphi_3 - \varphi_2.$$

If the antennas are calibrated, i.e., $\varphi_k = 0$ for all k=0,1,2,3, then $\theta_A = \theta_B = 0$, and the beams from the two polarizations are aligned and point to bore sight, as illustrated by the solid line in FIG. 2. If the antennas are not calibrated, i.e., $\varphi_k \neq 0$ for all k=0,1,2,3, but the phase differences of two polarizations are the same, i.e., $\theta_A = \theta_B \neq 0$, the beams from the two polarizations are still aligned while the beam direction is deviated from bore sight. For example, when $\theta_A = \theta_B \neq 135°$, the beams of the two polarizations can be illustrated by the dashed line in FIG. 2. However, when the phase difference from two beams is not equal, i.e., $\theta_A \neq \theta_B$, the two beams will point to different directions. The example shown in FIG. 1 can be considered such a case when $\theta_A = 0°$ and $\theta_B = 135°$. This misalignment leads to great performance degradation.

The phase of signal on antenna k, $\varphi_k$, for subcarrier frequency f, can be modeled as follows:

$$\varphi_k = \varphi_{k0} + 2\pi f \Delta t_k.$$

There are two components in $\varphi_k$: one is a fixed frequency independent phase $\varphi_{k0}$, another is a frequency dependent phase caused by timing delay $\Delta t_k$.

In industry, a related-art software-based antenna calibration and estimation method has been proposed to estimate the antenna timing delay and phase error. The basic related-art procedure is shown in FIG. 3. In this procedure, the base station, which in the illustrated example is a New Radio (NR) base station (i.e., a gNB), receives feedback from a User Equipment (UE). This UE is sometimes referred to herein as an assistant UE. This feedback is used by the gNB to estimate the phase and timing delay. Based on procedure, a New Radio base station (gNB) can calibrate the antennas so that the phases of different antennas are aligned.

SUMMARY

Embodiments of the present disclosure provide methods, apparatuses, and computer products for base station antenna calibration. A method is implemented in a base station for a cellular communications system. The method includes selecting, from a plurality of User Equipments, UEs, one or more assistant UEs to assist the base station with antenna calibration, wherein selecting the one or more assistant UEs is based upon criteria that includes UE channel state information, CSI, from the UEs; one or more uplink channel characteristics of an uplink channel from the UEs to the base station; a UE capability of the UEs; UE traffic information related to the UEs; and any combination thereof. A further step is obtaining antenna calibration assistance information from the one or more assistant UEs, the antenna calibration assistance information being information that is used by the base station for antenna calibration. Embodiments of the present disclosure provide improved estimation accuracy of delay and phase error, thus improving cell throughput, and/or minimized performance impact on the assistant UEs.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
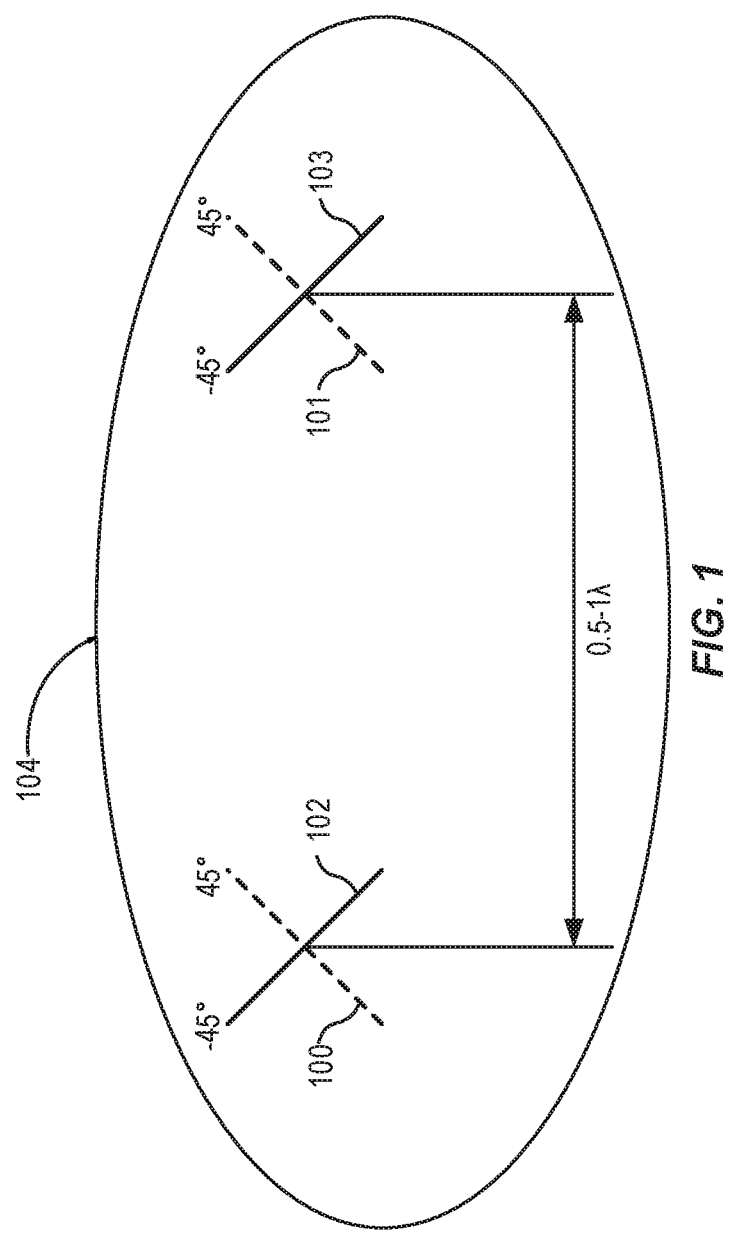
FIG. 1 is a diagram showing 4 correlated downlink transmit antennas.
Figure 2:
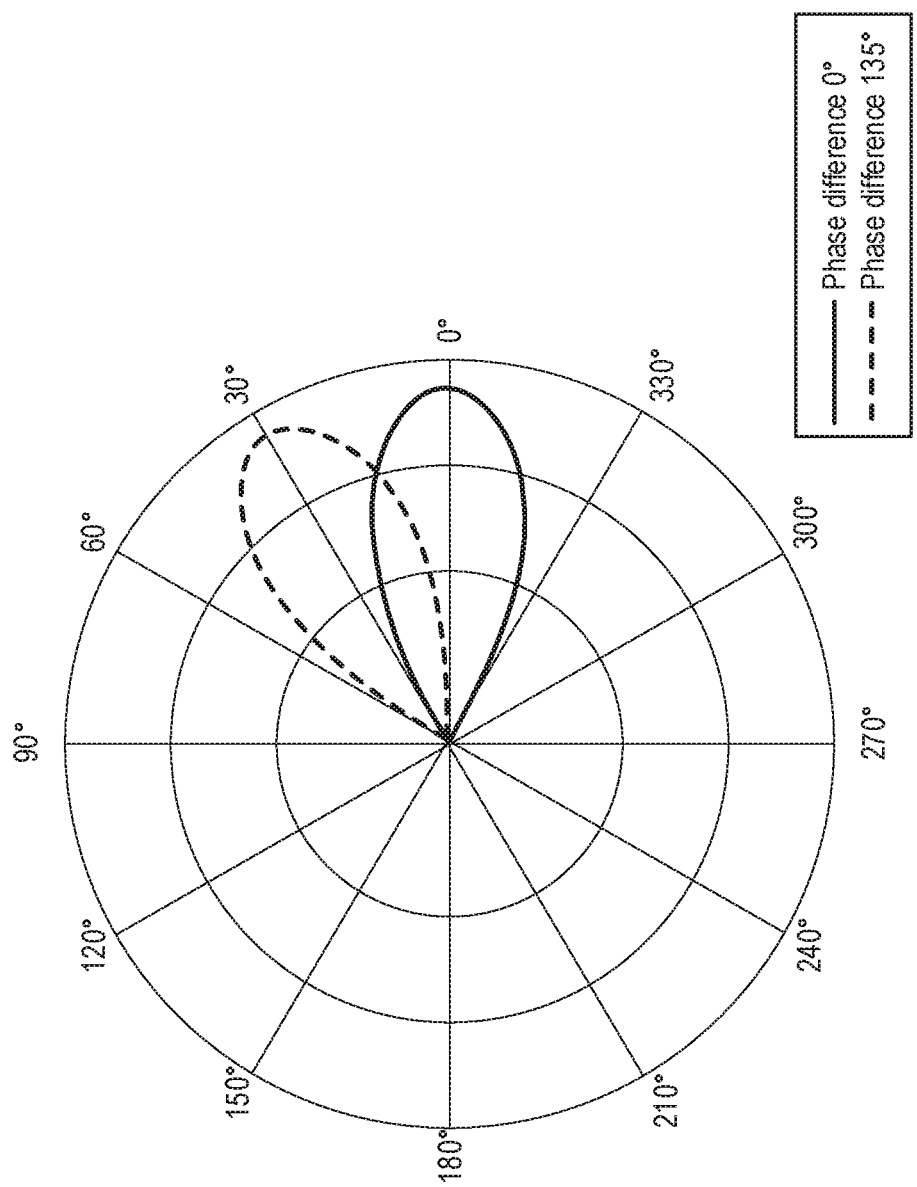
FIG. 2 is a polar radiation plot showing beams pointing to different directions with phase difference changes.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system. For example, a network node can be a base station.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
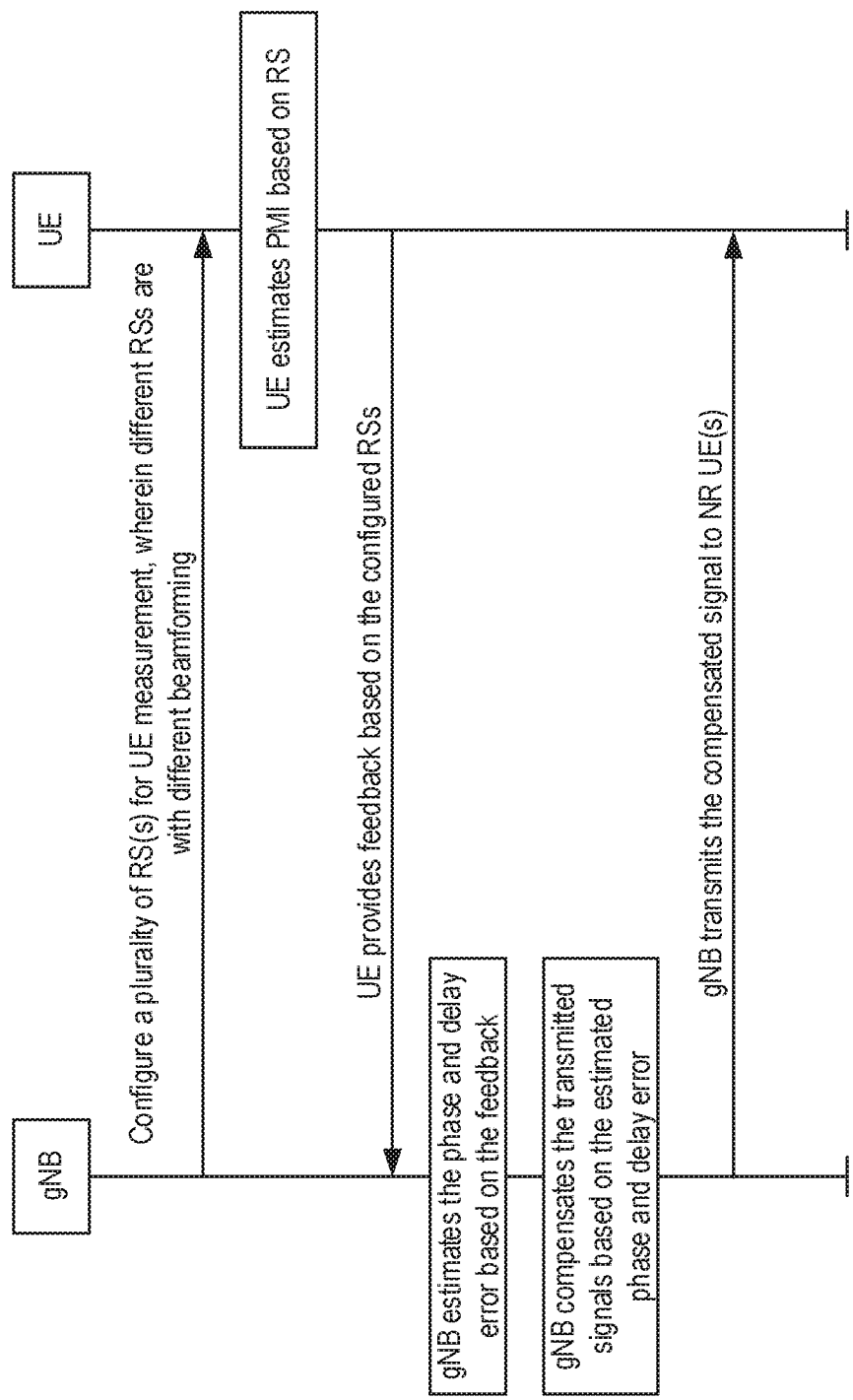
FIG. 3 is a flowchart showing a related-art antenna calibration algorithm.

Precoding matrix indicator (PMI)—based antenna calibration, such as that used in the procedure of FIG. 3, can achieve good performance. However, simulation results show that the assistant UE channel condition has great impact on the delay and phase estimation. Further, the assistant UE performance may be penalized since the assistant UE needs to provide additional feedback to the gNB besides the normal channel state information (CSI) feedback for normal data traffic. Without proper UE selection, either cell performance or UE performance may be affected. The present disclosure relates to a method to perform UE selection to increase the delay and phase estimation accuracy to increase the cell performance and to minimize the performance impact on the assistant UE.

Systems and methods are disclosed herein for selecting one or more assistant UEs for antenna calibration. Embodiments of systems and methods disclosed herein provide the following benefits:

improved estimation accuracy of delay and phase error, thus improving cell throughput, and/or minimized performance impact on the one or more assistant UEs.

Figure 4:
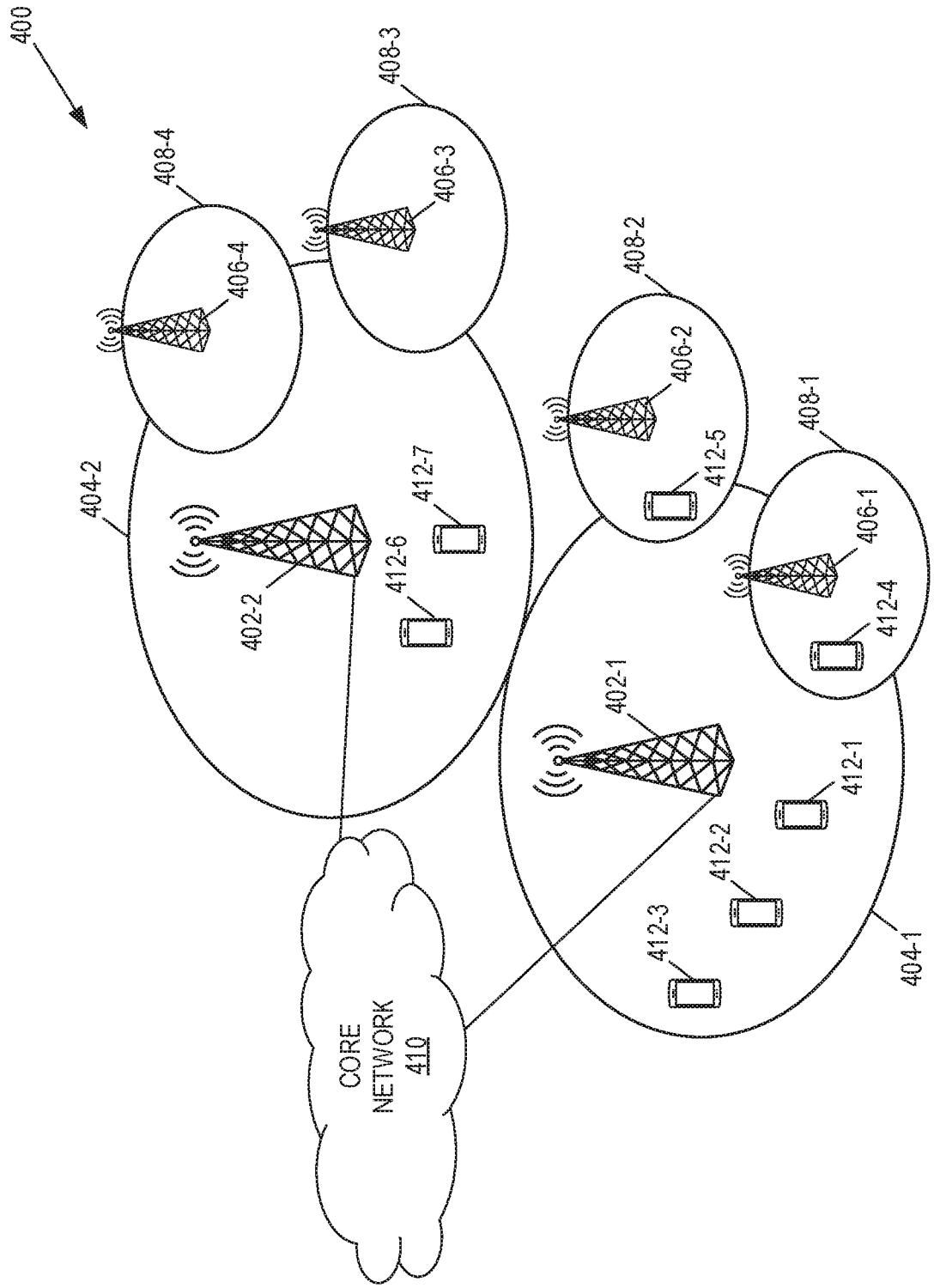
FIG. 4 illustrates one example of a cellular communications system according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410. The cellular communications system 400 shown in FIG. 4 further comprises a plurality of UEs 412-1 through 412-7 connected to either the base stations 402 or the low power nodes 406. The plurality of UEs 412-1 through 412-7 is generally referred to herein collectively as UEs 412 and individually as UE 412.

Figure 5:
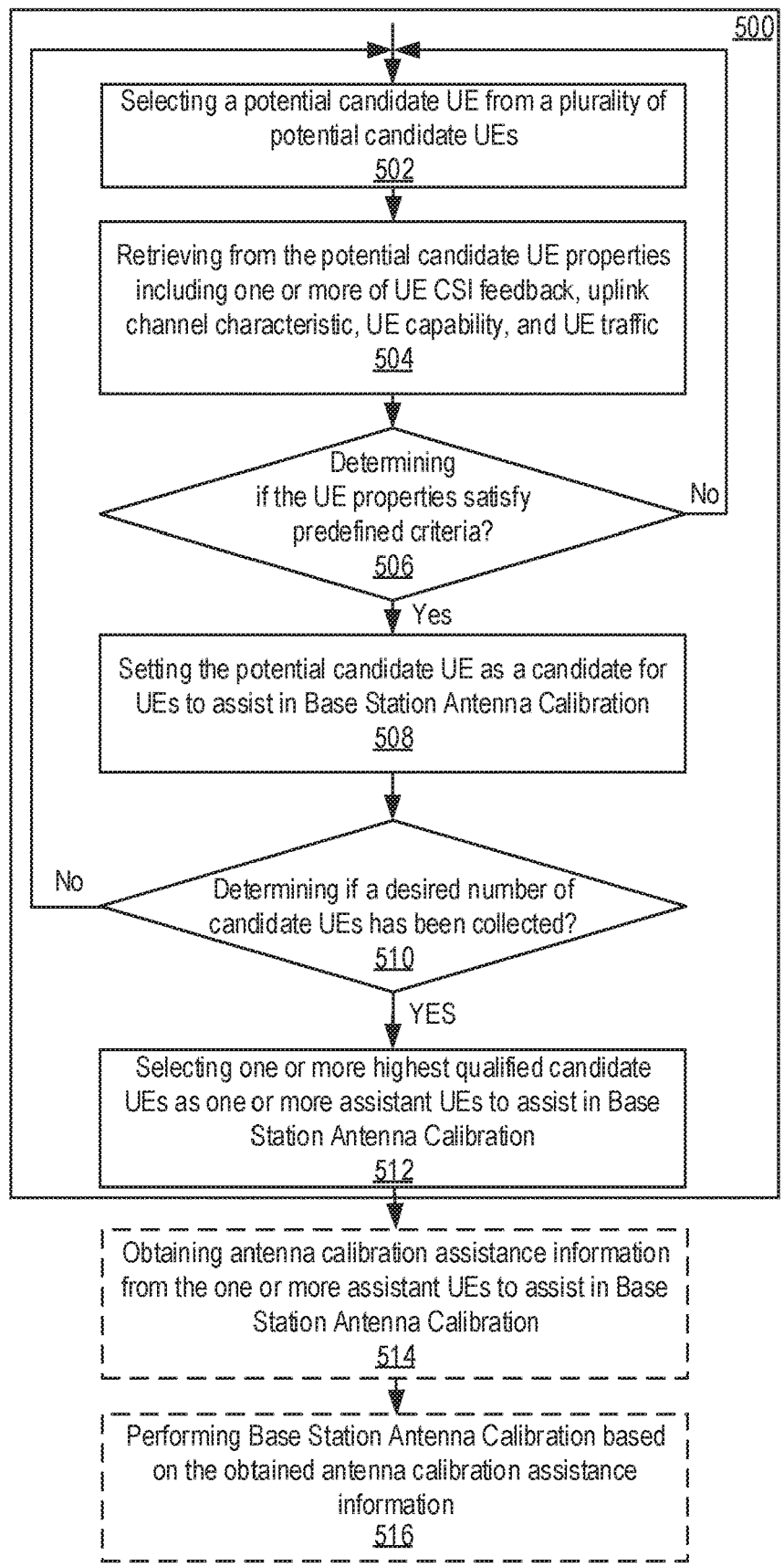
FIG. 5 is a flowchart showing a basic method implemented by a network to select one or more assistant user equipments (UEs) to assist a base station with antenna calibration, according to the present disclosure.

FIG. 5 is a flowchart showing a method implemented by a network node to select one of the UEs 412 to assist a base station such as a gNB with antenna calibration, according to an embodiment of the present disclosure. The base station that implements this method may be, for example, the base station 402-1 in the cellular communications system 400. This method is implemented to improve the estimation accuracy of antenna delay and phase error. The one or more assistant UEs 412-1 to assist the base station 402-1 with antenna calibration are carefully selected by the base station 402-1. The one or more assistant UEs 412-1 can be selected based on factors including one or more of UE channel state information (CSI) feedback, uplink channel characteristic estimated from the uplink received signal, UE capability, and UE traffic. Note that, in FIG. 5, optional steps are represented by dashed lines/boxes.

As illustrated, the base station 402-1 selects the one or more assistant UEs 412-1 from the plurality of UEs 412 that are potential candidates for assisting the base station 402 with antenna calibration (step 500). The potential candidate UEs 412 can be, for example, all UEs 412 served by the base station 402-1 or, in other words, all UEs 412 currently within a cell(s) served by the base station 402-1. In order to select the one or more assistant UEs 412-1, the base station 402-1 first selects a potential candidate UE 412-2 from the plurality of UEs 412 (step 502). The base station 402 then obtains properties of the selected potential candidate UE 412-2 including CSI feedback from the selected potential candidate UE 412-2, an uplink channel characteristic of an uplink channel between the selected potential candidate UE 412-2 and the base station 402-1, a UE capability of the selected potential candidate UE 412-2 that relates to its ability or suitability to serve as one of the assistant UEs 412-1, and an amount of UE traffic experienced by the selected potential candidate UE 412-2. Examples of channel characteristics can include one or more of angular spreads of uplink channel, delay spread, average arrival angle, average delay, doppler spread, and average frequency offset. Examples of UE capability can include one or more of support for 256 QAM (quadrature amplitude modulation), support for multiple CSI reports, and support for multiple CSI resource configuration.

The base station 402-1 checks the properties of the selected potential candidate UE 412-2 to determine whether the selected potential candidate UE 412-2 satisfies one or more criteria for potential selection as one of the assistant UEs 412-1 (step 506). If the properties of the selected potential candidate UE 412-2 satisfy the criteria, the selected potential candidate UE 412-2 is set as a candidate UE 412-3 to assist the base station 402-1 with antenna calibration (step 508). Otherwise, the potential candidate UE 412-2 is not selected as the candidate UE 412-3, and the process returns to the step 502 to select another potential candidate UE 412-2 from of the plurality of UEs 412.

Upon setting the potential candidate UE 412-2 as a candidate UE 412-3 in step 508, the base station 402-1 determines if a desired number of the candidate UEs 412-3 has been set (step 510). If not, the process returns to step 502 to select another potential candidate UE 412-2 from the plurality of UEs 412. Once the desired number of candidate UEs 412-3 has been set, the base station (402) selects highest qualified candidate UEs 412-3 as one or more assistant UEs 412-1 to assist the base station 402-1 with antenna calibration (step 512).

Once the one or more assistant UEs 412-1 are selected, the base station 402-1 obtains antenna calibration assistance information from the one or more assistant UEs 412-1 to assist in base station antenna calibration (step 514). The base station 402-1 then performs antenna calibration based on the obtained antenna calibration assistance information (step 516).

In one embodiment, the properties of the selected potential candidate UE 412-2 retrieved in step 504 and checked in step 506 include CSI feedback from the selected potential candidate UE 412-2. More specifically, in one embodiment, a metric value (m) is determined based on parameters including one or more of channel quality indicator (CQI), precoding matrix indicator (PMI), rank indicator (RI), layer indicator (LI), reference signal receive power (RSRP), and reference signal received quality (RSRQ). These parameters are retrieved from the potential candidate UE 412-2 in step 504. Then, in step 506, the base station 402-1 computes the metric value (m) and checks the metric value (m) to a predefined threshold. If the metric value is larger than the predefined threshold, the potential candidate UE 412-2 is selected as the candidate UE 412-3. Otherwise, the potential candidate UE 412-2 is not selected as the candidate UE 412-3. As one example, m =CQI. Larger CQI means the candidate UE 412-3 received signal quality is higher. With higher signal quality, the one or more assistant UEs 412-1 can get much more accurate PMI feedback. Thus, the base station 402-1 can get accurate phase error and delay error estimation based on accurate PMI feedback.

As another sub-embodiment, if the metric value (m) is smaller than a predefined threshold, the potential candidate UE 412-2 is selected as the candidate UE 412-3. Otherwise, the potential candidate UE 412-2 is not selected as the candidate UE 412-3. As one example, m=$MI_{CQI}$*RI, the threshold can be defined as the $MI_{CQI_{max}}$, where $MI_{CQI}$ is the mutual information indicated by CQI and $MI_{CQI_{max}}$ is the mutual information indicated by the maximum CQI for one layer. When the received signal is too strong, it exceeds the maximum MI indicated by CQI. For some potential candidate UE 412-2, the suboptimal PMI may also give the maximum MI when the signal is very strong, and thus the suboptimal PMI may be reported. In this case, the base station 402-1 cannot get the optimal PMI, which leads to the degradation of base station phase and delay estimated accuracy. To avoid reporting of suboptimal PMI, when the CQI is too high, the potential candidate UE 412-2 may be excluded. Further, for a normal CSI report, the potential candidate UE 412-2 may use link adaption. Thus, the rank report has no restriction. However, for the CSI report for antenna calibration, in most cases, rank is restricted into rank-1. To guarantee the CQI with rank-1 is not saturated, RI can be included in the metric value. If the $MI_{CQI}$*RI<$MI_{CQI_{max}}$, when the potential candidate UE 412-2 reports rank-1, the rank-1 CQI is not saturated.

As another sub-embodiment, the above two sub-embodiments can be combined. For example, if the CQI>$CQI_{threshold}$ and $MI_{CQI}$*RI<$MI_{CQI_{max}}$, the potential candidate UE 412-2 is selected as the candidate UE 412-3. Otherwise, the potential candidate UE 412-2 is not selected.

For the UE selection based on CSI, in one embodiment, the first CSI configuration may be configured in the UE selection phase, and the second CSI configuration may be configured for the calibration phase. For example, in the UE selection phase, the CSI report can be configured without any CSI report constraint, and in the calibration phase, the one or more assistant UEs 412-1 can be configured with the constraint of the CSI report. For example, only rank-1 CSI is reported for the calibration phase. As another embodiment, for the one or more assistant UEs 412-1, multiple CSI reports may be configured, one for a normal report, which is target for link adaptation, and one configured with report restriction, such as rank restriction, its target being for calibration.

In one embodiment, the properties of the selected potential candidate UE 412-2 retrieved in step 504 and checked in step 506 include one or more channel properties of the selected potential candidate UE 412-2. More specifically, in one embodiment, the base station 402 retrieves UE uplink signals and extracts one or more channel characteristics from the uplink signals. The uplink signals can include reference signals, such as the demodulation reference signal (DMRS) for data/control channel, physical random access channel (PRACH), sounding reference signal (SRS), or they can also include data/control symbols. The channel characteristic can include one or more of the angular spreads of uplink channel, delay spread, average arrival angle, average delay, doppler spread, average frequency offset, channel correlation between different receive (RX) branches, and the received signal power. In step 506, the base station 402 checks whether the extracted channel characteristic satisfies the criteria. If the extracted channel characteristic satisfies the criteria, the potential candidate UE 412-2 is set as a candidate UE 412-3 for assisting the base station 402 with base station antenna calibration. Otherwise, the potential candidate UE 412-2 is not selected as a candidate UE 412-3.

In further detail, in step 506, the base station computes a metric value (m) based on parameters including one or more of the angular spreads of the uplink channel, delay spread, average arrival angle, average delay, doppler spread, average frequency offset, channel correlation between different RX branches, and the received signal power. If the metric value (m) is larger than a predefined threshold, the potential candidate UE 412-2 is selected as a candidate UE 412-3. Otherwise, the potential candidate UE 412-2 is not selected as a candidate UE 412-3. As one example, the metric value (m) can be defined by the base station antenna correlation. In another example, the base station antenna correlation can be given by the following:

$$m = \rho^{BS}_{s_1,s_2} = \frac{1}{N^{UE}_{tx}} \sum_{n_r=0}^{N_r-1} E\left\{\frac{h_{nr,s_1} h^*_{nr,s_2}}{\sigma_{h_{nr,s_1}} \sigma_{h_{nr,s_2}}}\right\}$$

where $h_{nr,s}$ is a channel between the $n_r$ UE antenna and s base station antenna, $\sigma_{h_{nr,s}}$ is the standard deviations of $h_{nr,s}$, where E{.} denotes the statistical average and $N_{tx}^{UE}$ is the number of the UE transmitted antenna. Given one threshold based on simulation $th_1$, if m>$th_1$, the potential candidate UE 412-2 is selected as a candidate UE 412-3. Otherwise, the potential candidate UE 412-2 is not selected as a candidate UE 412-3. Based on the simulation, the higher the correlation of the base station channel, the more accurate the phase and delay estimation will be. The channel can be estimated based on the above-mentioned uplink signals.

As another example, the metric value (m) can be defined by the UE doppler. When the uplink channel is obtained, UE doppler can be estimated. Based on the simulation, a moderate doppler value is beneficial for the delay and phase estimation. Thus, assume $th_1$ is the threshold of lower bound and $th_2$ is the threshold of upper bound, then if $f_d \in (th_1, th_2)$, the potential candidate UE 412-2 is selected as a candidate UE 412-3. Otherwise, the potential candidate UE 412-2 is not selected.

In one embodiment, the properties of the selected potential candidate UE 412-2 retrieved in step 504 and checked in step 506 include one or more capabilities of the selected potential candidate UE 412-2. More specifically, in one embodiment, if the UE capability satisfies predefined criteria, the potential candidate UE 412-2 is set as a candidate UE 412-3 to assist the base station 402 with base station antenna calibration. Otherwise, the selected potential candidate UE 412-2 is not selected as a candidate UE 412-3.

In further detail in step 506, the criteria is defined by the parameters including one or more of supported modulation coding scheme (MCS) table, supported CQI table, CSI report related capability, and CSI RS related capability. For example, the criteria can be defined as one or more of the following conditions:

(1) Supporting 256 QAM (quadrature amplitude modulation),
(2) Supporting multiple CSI reports, and
(3) Supporting multiple CSI resource configuration(s).

With the condition (1), the signal-to-interference-plus-noise ratio (SINR) range of selected potential candidate UE 412-2 can be increased by the base station 402 so as to loosen the requirement on the selected potential candidate UE 412-2 received SINR and further to increase the probability to find the one or more assistant UEs 412-1.

With the condition (2), if the one or more assistant UEs 412-1 are supporting multiple CSI reports, the one or more assistant UEs 412-1 can each use one CSI report for link adaptation of normal data transmission and one CSI report for base station antenna calibration.

With the condition (3), the base station 402-1 can configure multiple CSI resources: one set of multiple CSI resource configurations is used for obtaining CSI report(s) for link adaptation, and another set of multiple CSI resource configurations is used for obtaining CSI report(s) that are used for base station antenna calibration.

As another example, for a UE with low capability, such as UE the supported maximum data rate of which is lower than a threshold, the potential candidate UE 412-2 is not selected as the candidate UE 412-3; otherwise, the potential candidate UE 412-2 is selected as the candidate UE 412-3. For the lower capability UE, their power and processing capability is limited in most cases, thus, these UEs shall be avoided to be taken as the candidate UE. Due to capability constraint, if the candidate UE 412-3 is selected to be one of the assistant UEs 412-1, it may greatly affect the lower capability UE performance. Thus, the base station (402-1) can try to avoid selecting a lower capability UE.

As another example, for a UE with power constraint, such as CAT-M UE, NB-IOT UE, the potential candidate UE 412-2 is not selected as the candidate UE 412-3; otherwise, the potential candidate UE 412-2 is selected as the candidate UE 412-3.

In one embodiment, the properties of the selected potential candidate UE 412-2 retrieved in step 504 and checked in step 506 include UE traffic characteristic of the selected potential candidate UE 412-2. More specifically, in one embodiment, for downlink, the downlink data buffer is retrieved as the UE traffic characteristic. For uplink, traffic information based on the UE buffer status reporting is retrieved as the UE traffic characteristic. In a step 506, the potential candidate UE 412-2 is selected as a candidate UE 412-3 if the UE traffic characteristic of the potential candidate UE 412-2 satisfies the criteria.

In more detail in step 506, a metric value (m) is defined by parameters including one or more of downlink buffer status and uplink buffer status. As one example, the buffer size can be used as the criteria metric m=buffer_size. For a higher capability UE, if m is larger than a first threshold, the potential candidate UE 412-2 is set in a step 506 as a candidate UE 412-3. Otherwise, the potential candidate UE 412-2 is not selected as the candidate UE 412-3 and the procedure returns to step 502 to select another potential candidate UE 412-2 from the plurality of UEs 412.

Figure 6:
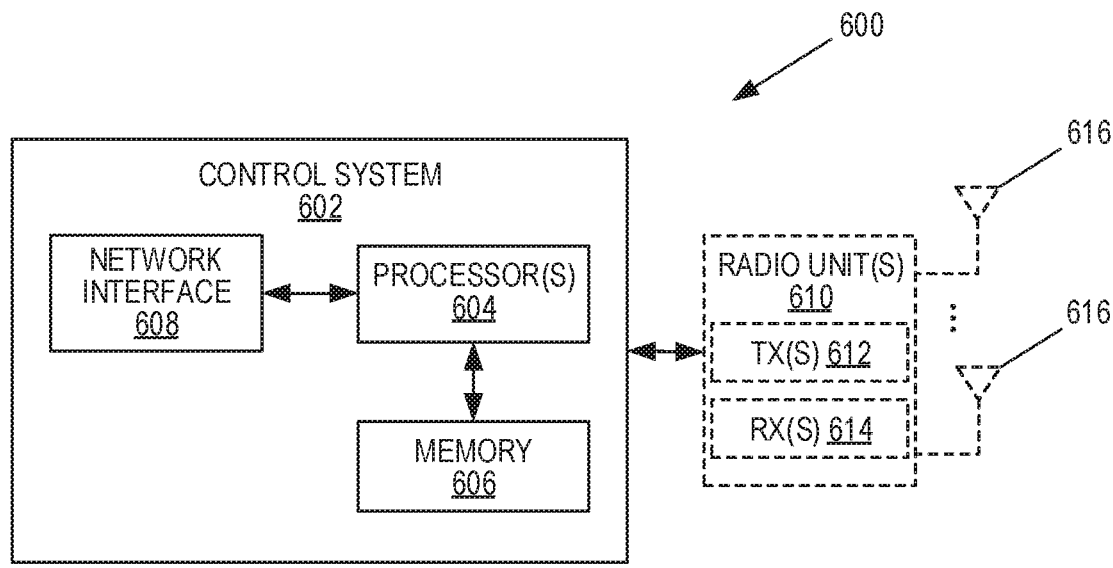
FIG. 6 is a schematic block diagram of a radio access node according to some other embodiments of the present disclosure.

FIG. 6 is a schematic block diagram of a radio access node 600 according to some embodiments of the present disclosure. Optional features are represented by dashed boxes. The radio access node 600 may be, for example, the base station 402 or 406 or a base station that implements all or part of the functionality of the base station 402 or gNB described herein. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 may include one or more radio units 610 that each includes one or more transmitters 612 and one or more receivers 614 coupled to one or more antennas 616. The one or more radio units 610 may be referred to or be part of radio interface circuitry. In some embodiments, the one or more radio unit(s) 610 are external to the control system 602 and are connected to the control system 602 via, e.g., a wired connection (e.g., an optical cable). However, in some other embodiments, the one or more radio unit(s) 610 and potentially the one or more antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
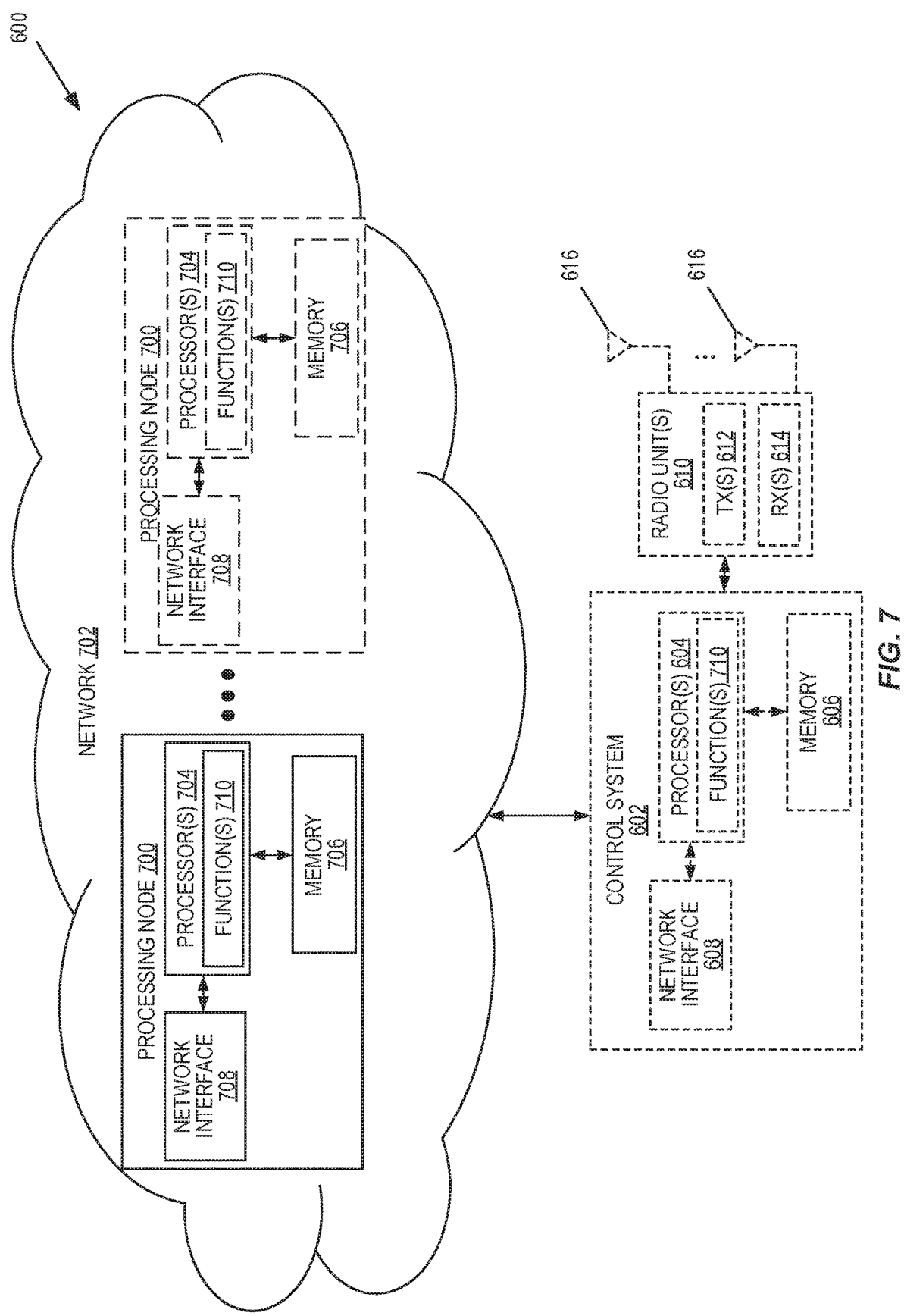
FIG. 7 is a schematic block diagram that illustrates a virtualized embodiment of the radio access node according to some embodiments of the present disclosure.

FIG. 7 is a schematic block diagram that illustrates a virtualized embodiment of the radio access node 600 according to some embodiments of the present disclosure. This discussion is equally applicable to other types of base stations. Further, other types of base stations may have similar virtualized architectures. Again, optional features are represented by dashed boxes.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 may include the control system 602 and/or the one or more radio units 610, as described above. The control system 602 may be connected to the one or more radio units 610 via, for example, an optical cable or the like. The radio access node 600 includes one or more processing nodes 700 coupled to or included as part of a network(s) 1302. If present, the control system 602 or the one or more radio unit(s) are connected to the processing node(s) 700 via the network 702. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the one or more processing nodes 700 and the control system 602 and/or the radio unit(s) 610 in any desired manner. In some particular embodiments, some or all of the functions 710 of the radio access node 600 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 602 is used in order to carry out at least some of the desired functions 710. Notably, in some embodiments, the control system 602 may not be included, in which case the radio unit(s) 610 communicate directly with the processing node(s) 1300 via an appropriate network interface(s).

In some embodiments, a computer program including instructions which, when executed by at least one processor, cause the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
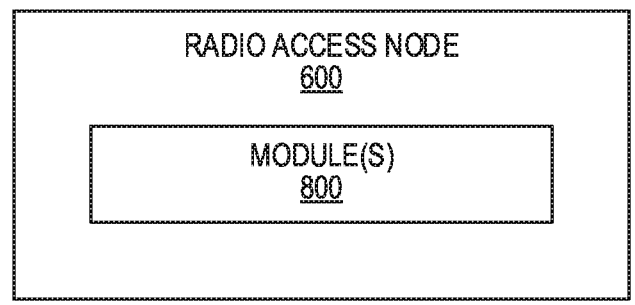
FIG. 8 is a schematic block diagram of the radio access node according to some other embodiments of the present disclosure.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 13 where the modules 800 may be implemented at one of the processing nodes 700 or distributed across multiple processing nodes 700 and/or distributed across the processing node(s) 1300 and the control system 602.

Figure 9:
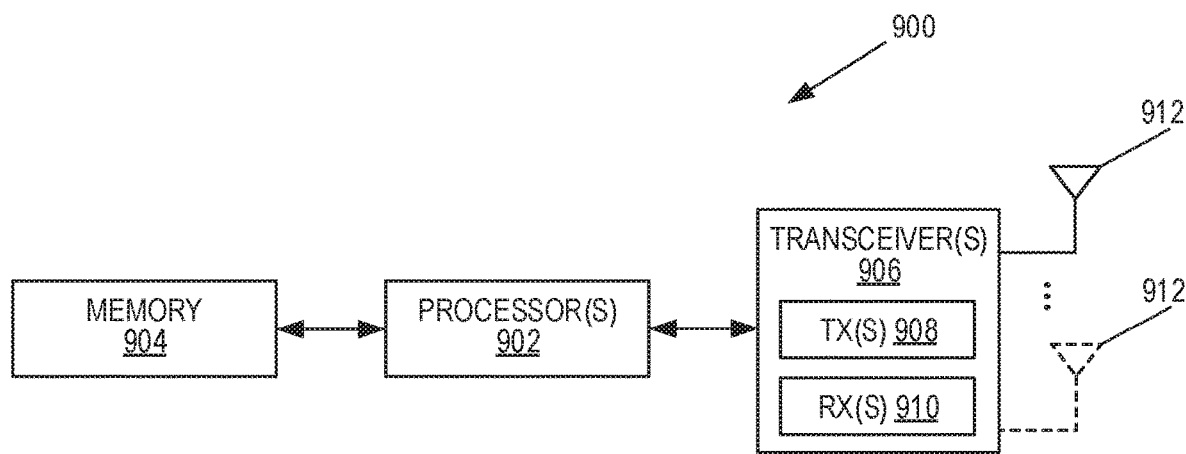
FIG. 9 is a schematic block diagram of a User Equipment device (UE) according to some embodiments of the present disclosure.

FIG. 9 is a schematic block diagram of a wireless communication device 900 according to some embodiments of the present disclosure. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The one or more transceivers 906 include radio-front end circuitry connected to the one or more antennas 912 that are configured to condition signals communicated between the one or more antennas 912 and the one or more processor(s) 902, as will be appreciated by one of ordinary skill in the art. The one or more processors 902 are also referred to herein as processing circuitry. The one or more transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9, such as one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, cause the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
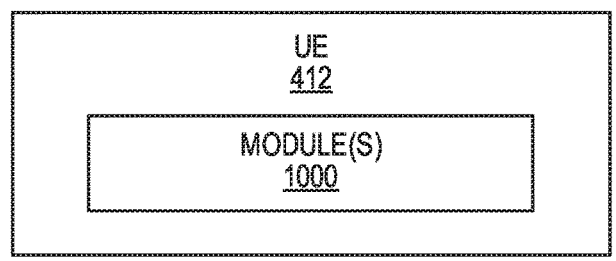
FIG. 10 is a schematic block diagram of the UE of FIG. 9 according to some other embodiments of the present disclosure.

FIG. 10 is a schematic block diagram of the wireless communication device 900 according to some other embodiments of the present disclosure. The wireless communication device 900 includes one or more modules 1000, each of which is implemented in software. The one or more modules 1000 provide the functionality of the wireless communication device 900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BS Base Station
CP Cyclic Prefix
CPU Central Processing Unit
CQI Channel Quality Indicator
CSI Channel State Information
CSI-RS Channel State Information Reference Signal
DMRS Demodulation Reference Signal
DN Data Network
DSP Digital Signal Processor
eNB Enhanced or Evolved Node B
EPC Evolved Packet Core
EPS Evolved Packet System
E-UTRA Evolved Universal Terrestrial Radio Access
E-UTRAN Evolved Universal Terrestrial Radio Access Network
FPGA Field Programmable Gate Array
gNB New Radio Base Station
gNB-DU New Radio Base Station Distributed Unit
HSS Home Subscriber Server
IoT Internet of Things
IP Internet Protocol
LI Layer Indicator
LTE Long Term Evolution
MCS Modulation Coding Scheme
MI Mutual Information
MME Mobility Management Entity
MTC Machine Type Communication
NEF Network Exposure Function
NF Network Function
ng-eNB Next Generation enhanced Node B
NG-RAN Next Generation Radio Access Network
NR New Radio
NRF Network Function Repository Function
NSSF Network Slice Selection Function OTT Over-the-Top
PC Personal Computer
PCF Policy Control Function
P-GW Packet Data Network Gateway
PMI Precoding Matrix Indicator
PRACH Physical Random Access Channel
QAM Quadrature Amplitude Modulation
QoS Quality of Service
RAM Random Access Memory
RAN Radio Access Network
RI Rank Indicator
ROM Read Only Memory
RRH Remote Radio Head
RSRP Reference Signal Receive Power
RSRQ Reference Signal Received Quality
RTT Round Trip Time
RX Receive
SCEF Service Capability Exposure Function
SIN R Signal-to-Interference-plus-Noise Ratio
SMF Session Management Function
SRS Sounding Reference Signal
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method implemented in a base station for a cellular communications system, the method comprising:
   selecting, from a plurality of User Equipments, UEs, one or more assistant UEs to assist the base station with antenna calibration, wherein selecting the one or more assistant UEs is based upon criteria that includes one or more of: (a) UE channel state information, CSI, from the UEs; (b) one or more uplink channel characteristics of an uplink channel from the UEs to the base station; (c) a UE capability of the UEs, (d) UE traffic information related to the UEs; and
   obtaining antenna calibration assistance information from the one or more assistant UEs, the antenna calibration assistance information being information that is used by the base station for antenna calibration;
   wherein selecting from the plurality of UEs, one or more assistant UEs to assist the base station with antenna calibration comprises:
   selecting a potential candidate UE from the plurality of UEs;
   retrieving from the potential candidate UE, UE properties that include one or more of UE CSI feedback, uplink channel characteristic, UE capability, and UE traffic; and
   determining if the UE properties satisfy a predefined criteria;
   setting the potential candidate UE as a candidate UE to assist in base station antenna calibration;
   determining if a desired number of candidate UEs has been collected; and
   selecting one or more highest qualified candidate UEs as the one or more assistant UEs if the desired number of candidate UEs has been collected.

2. The method of claim 1 further comprising performing base station antenna calibration for the base station based on the obtained antenna calibration assistance information.

3. The method of claim 1 wherein selecting (500) the one or more assistant UEs to assist the base station with antenna calibration is based upon a metric value which is determined by the base station based on one or more uplink channel characteristics extracted by the base station from uplink signals received by the base station.

4. The method of claim 3 wherein if the metric value is greater than a predefined threshold value, the potential candidate UE is selected as a candidate UE.

5. The method of claim 3 wherein if the metric value is less than a predefined threshold, the UE is selected as a candidate UE.

6. The method of claim 3 wherein the one or more uplink channel characteristics include angular spreads of the uplink channel, delay spread, average arrival angle, average delay, doppler spread, average frequency offset, channel correlation between different receive branches, and received signal power.

7. The method of claim 6 wherein channel correlation between the different receive branches is determined by the base station (402-1) where $$m = \rho^{BS}_{s_1,s_2} = \frac{1}{N^{UE}_{tx}} \sum_{n_r=0}^{N_r-1} E\left\{ \frac{h_{nr,s_1} h^*_{nr,s_2}}{\sigma_{h_{nr,s_1}} \sigma_{h_{nr,s_2}}} \right\}$$

and where $h_{nr,s}$ is a channel between a $n_r$ UE antenna and a s base station antenna, $\sigma_{h_{nr,s}}$ is standard deviations of $h_{nr,s}$, where $E\{\cdot\}$ denotes a statistical average and $N_{tx}^{UE}$ is a number of UE transmit antennas.

8. The method of claim 7 wherein if m is greater than a predefined threshold the potential candidate UE is selected as a candidate UE.

9. The method of claim 1 wherein selecting the one or more assistant UEs to assist the base station with antenna calibration is based upon a metric value which is determined by the base station based on a UE CSI report.

10. The method of claim 9 wherein the UE CSI report includes one or more of channel quality indicator (CQI), precoding matrix indicator (PMI), rank indicator (RI), layer indicator (LI), reference signal receive power (RSRP), and reference signal received quality (RSRQ).

11. The method of claim 10 wherein if the metric value is greater than a predefined threshold value, the potential candidate UE is selected as a candidate UE.

12. The method of claim 10 wherein if the metric value is less than a predefined threshold, the UE is selected as a candidate UE.

13. The method of claim 1 wherein selecting (500) the one or more assistant UEs is based upon UE capability.

14. The method of claim 13 wherein the UE capability comprises support for one or more particular modulation and coding schemes.

15. The method of claim 13 wherein the UE capability comprises a capability to provide multiple CSI reports.

16. The method of claim 15 wherein the multiple CSI reports comprise one CSI report for normal data transmission and one CSI report for base station antenna calibration.

17. The method of claim 15 wherein the UE capability comprises a capability to receive multiple CSI resource configurations.

18. The method of claim 17 wherein one set of the multiple CSI resource configurations is for obtaining CSI report(s) for link adaptation and another set of the multiple CSI resource configurations are for obtaining CSI report(s) that are usable for base station antenna calibration.

19. A base station configured to communicate with a plurality of user equipments, UEs, the base station comprising:
- at least one processor configured to cause the base station to:
  - select, from among a plurality of UEs, one or more assistant UEs to assist the base station with antenna calibration, wherein the base station selects the one or more assistant UEs based upon criteria that includes one or more of: (a) UE channel state information, CSI, from the UEs; (b) one or more uplink channel characteristics of an uplink channel from the UEs to the base station; (c) a UE capability of the UEs, (d) UE traffic information related to the UEs; and
  - obtain antenna calibration assistance information from the one or more assistant UEs, the antenna calibration assistance information being information that is used by the base station for antenna calibration;
- wherein the at least one processor is further configured to cause the base station to:
  - select a potential candidate UE from the plurality of UEs;
  - retrieve from the potential candidate UE, UE properties that include one or more of UE CSI feedback, uplink channel characteristic, UE capability, and UE traffic;
  - determine if the UE properties satisfy a predefined criteria;
  - set the potential candidate UE as a candidate UE to assist in base station antenna calibration;
  - determine if a desired number of candidate UEs has been collected; and
  - select highest qualified candidate UEs as the one or more assistant UEs if the desired number of candidate UEs has been collected.

20. The base station of claim 19 wherein the at least one processor is further configured to cause the base station to select the one or more assistant UEs based upon a metric associated with UE traffic.

21. The base station of claim 20 wherein the metric associated with the UE traffic is one or more of downlink buffer status and uplink buffer status.

* * * * *